Patented Feb. 16, 1932

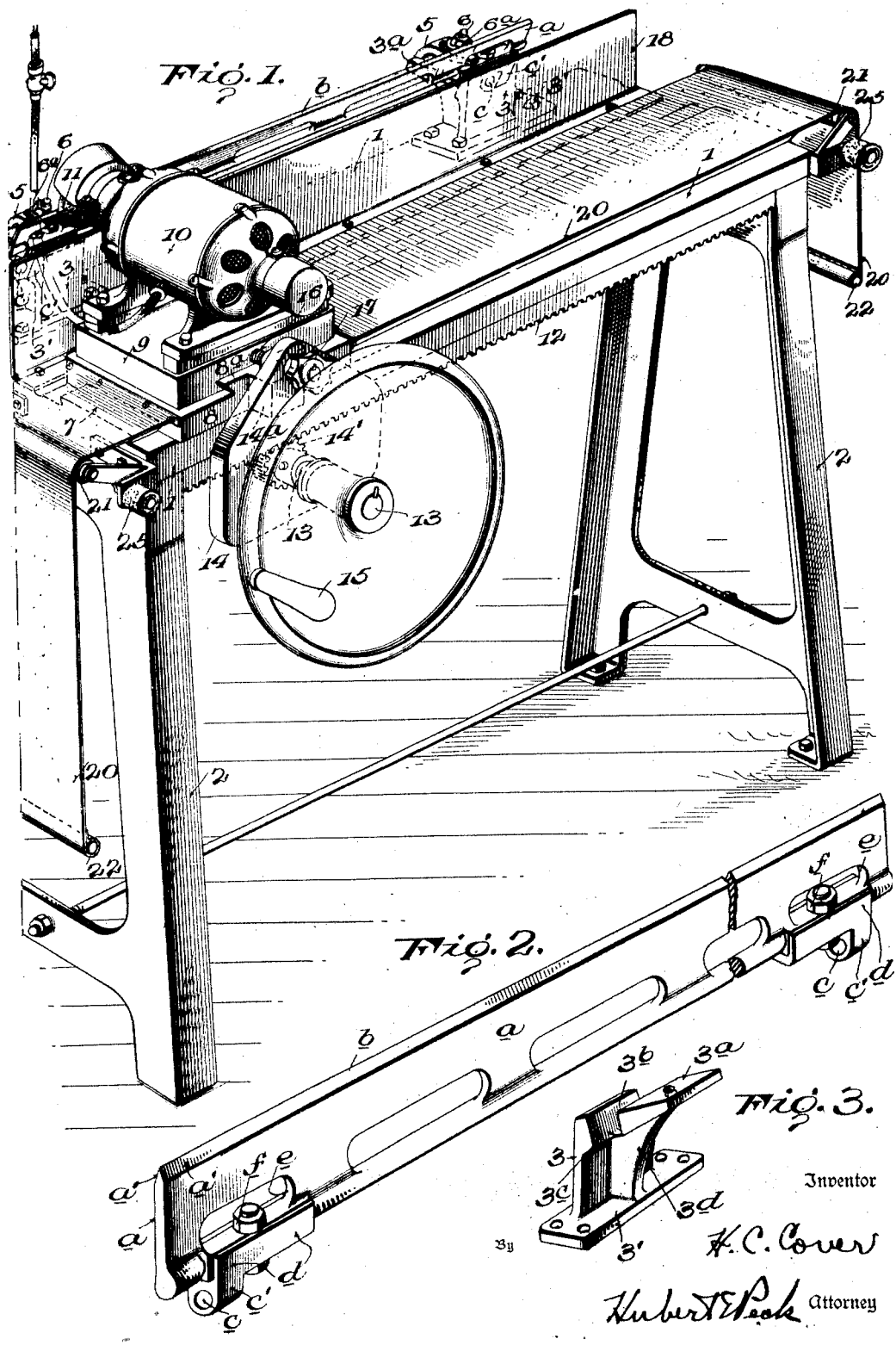

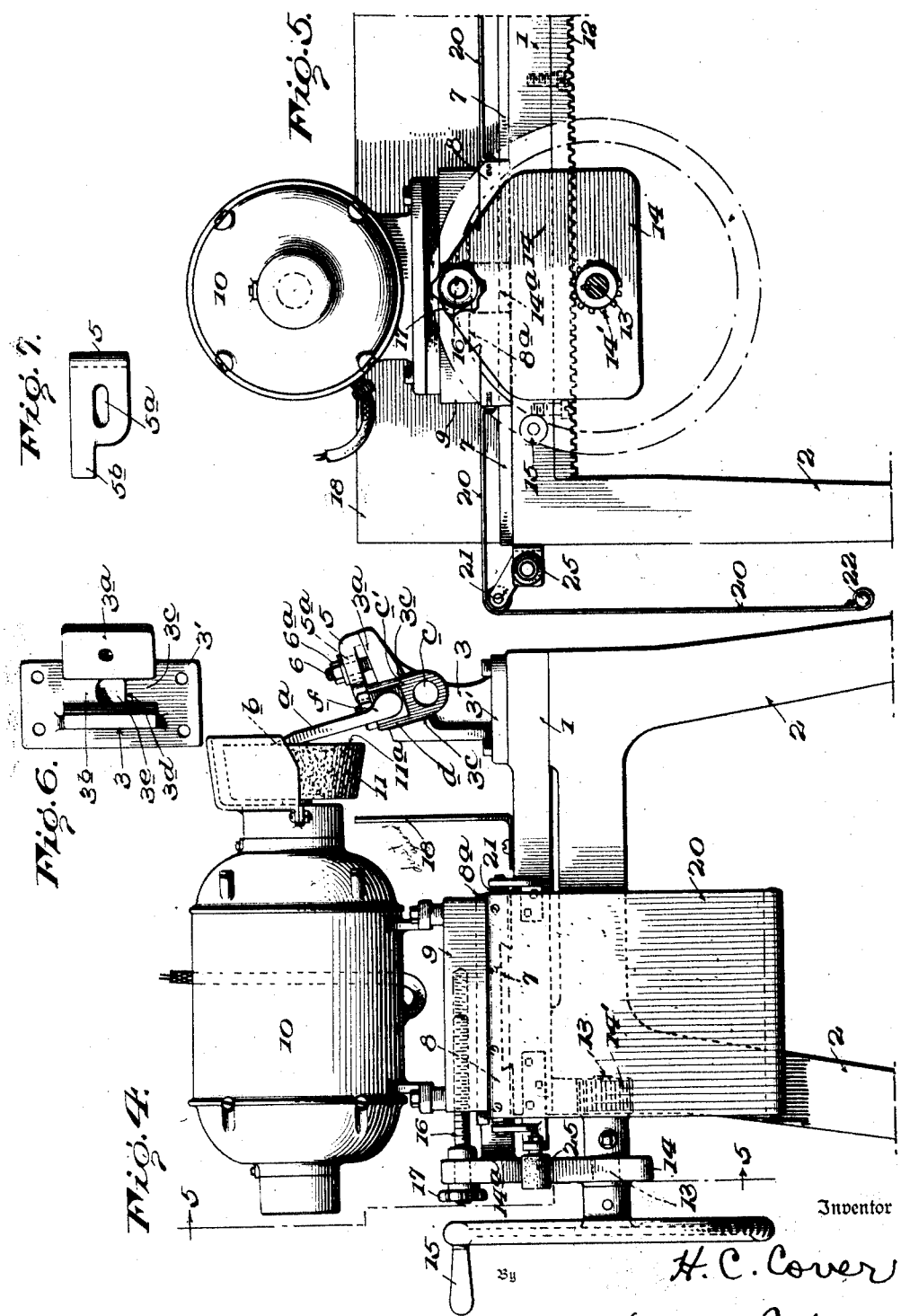

1,845,908

UNITED STATES PATENT OFFICE

HARRY CLEMSON COVER, OF BALTIMORE, MARYLAND, ASSIGNOR TO HIMSELF AND L. MANUEL HENDLER, OF BALTIMORE, MARYLAND

GRINDING ICE CREAM FREEZER SCRAPERS

Application filed September 30, 1927. Serial No. 223,189.

This invention relates to the provision of means for the rapid and accurate grinding of scrapers employed in commercial ice cream freezers; and the objects and nature of the invention will be readily understood by those skilled in the art in the light of the following explanation of the accompanying drawings that illustrate what I now believe to be the preferred mechanical expression or embodiment of my invention from among other forms, constructions and arrangements within the spirit and scope of the invention.

In the commercial ice cream industry, the maintenance of the scraper blades in proper condition presents a serious problem. Rapid and economical production of the desired smooth ice cream product free of gritty like frozen or ice particles, requires among other considerations, properly beveled, true and sharp scraper blades. To the best of my knowledge and information, the practice in the commercial ice cream industry, is to sharpen scraper blades by the use of files, particularly in view of the fact that it is exceedingly difficult if not impossible to separately remove the scraper blades from the types of commercial ice cream freezers in general use, thus necessitating the removal of the entire rotary dasher assembly from the freezer and the sharpening of the blades while in the assembly. The filing operation is exceedingly tedious and expensive as well as inaccurate with a tendency to permanently bend the blades from their original straight forms, particularly as the blades are usually composed of more or less soft brass. To the best of my knowledge there are no grinders on the market in use in the ice cream industry for sharpening freezer scrapers or that are adapted and designed to meet the peculiar requirements of this particular work.

It is the object of my invention to provide a grinder that will meet the peculiar conditions and requirements of the ice cream industry in the matter of sharpening freezer scrapers and that will be exceedingly simple and fool proof in construction and operation for the above mentioned particular purpose.

With the foregoing and other objects in view my invention consists in certain novel features of construction, arrangement and combination as will be more fully described and specified hereinafter.

Referring to the accompanying drawings forming a part hereof:—

Fig. 1 is a perspective view of apparatus embodying my invention.

Fig. 2 is a detailed perspective showing an ice cream freezer scraper of a common type.

Fig. 3 is a detailed perspective of one of the work holders.

Fig. 4 shows the machine of my invention in end elevation.

Fig. 5 is a vertical sectional view taken on the line 5—5, Fig. 4.

Fig. 6 is a top plan of one of the duplicate scraper blade holder brackets, on a reduced scale.

Fig. 7 is a top plan of one of the clips for holding the scraper blade against upward movement in the holder brackets.

Commercial ice cream freezer scrapers of the type in general use, embody a long blade $a$, of brass, the free or scraping longitudinal edge of which is transversely beveled at its longitudinal side faces $a'$ to produce the longitudinal scraping edge $b$, which should bt straight and true and accurately parallel with the axis on which the blade rocks toward and from the inner cylindrical surface of the freezer. This axis is indicated in Fig. 2 of the drawings by the alined bearing bores $c$, in depending ears $c'$, of the slips $d$, secured to and depending from the stiff thickened longitudinal back edge of the blade.

This scraper blade is usually flat and wide from its thickened back longitudinal edge to its free sharp edge, and adjacent to the ends of its back edge, is formed with transverse openings $e$. The clips $d$, are trough like or U shape in cross section and fit over the end portions of the blade back, and are usually secured to the blade in any suitable manner, as by bolts $f$, with the bolt nuts located in said openings $e$, and the bolt heads bearing as the flat back faces of the clips. These clips are thus rigidly secured to the back edge of the scraper, and at their outer ends are formed with the rigid depending lugs or ears that provide the bearing bores *c*. These end clips and their projecting ears *c'*, are preferably formed with parallel flat opposite side faces.

I utilize the opposite end formation of the scraper blades, in providing means in a grinder for such blades, that will receive the blade and hold the same in the desired fixed position for grinding by reason of the blade formation and the cooperating formation of the holder, without the necessity of providing various adjustable clamps and other devices.

For instance, in the embodiment illustrated by the drawings my machine provides a horizontal longitudinally elongated table top 1, that can be supported in any suitable manner as by legs or standards 2. On this table top I provide at least two upstanding brackets or holders 3, that are normally fixed to the table top through the medium of their bases 3', and suitable bolts or other fastening means passing therethrough into the table top. In the embodiment illustrated, I provide a pair of similar upstanding rigid holders 3, and these holders are alined longitudinally of the table top and are arranged near the ends thereof and to one side of the longitudinal center line of the table top. In this example, each holder is formed of a casting consisting of the horizontal base 3', an upstanding stem rigid therewith and having a rearwardly extending top platform 3a, at its forward portion formed with a longitudinal groove or socket 3b, extending completely across the platform from edge to edge thereof and at its outer end opening vertically completely through the platform at 3c, at the outer vertical side of the upstanding flange 3d, that joins the base 3', and the under side of the platform 3a. The seats or sockets 3b, and 3c, of the two holders 3, are accurately alined and are formed to receive the end clips *d*, of a scraper blade extending between and supported by the two holders and seated in said grooves or sockets. The two holders 3, are spaced the required distance apart to receive the ends of the scraper blade with the depending ears *c'*, of the scraper blade fitted in and depending through the vertical end sockets 3c, and with the longitudinal portions of the clips *d*, resting in and seated on the floors of the sockets or grooves 3b. The sockets 3b, 3c, are cut or formed at an inclination from the vertical, as indicated particularly by Fig. 4, to provide inclined flat parallel side walls that will fit the flat opposite side surfaces of the clips *d*, and their ears *c'*, and hold the scraper blade upstanding from the holders *c*, at an angle from the vertical that corresponds with the required angle of the bevel *a'*, of the blade.

In other words, the normally fixed rigid holders 3, are so shaped so as to straddle the end portions of the scraper blade and hold that blade in the desired position and at the desired angle for straight accurate grinding, and so that the scraper blade can be dropped down into these holders and upstand therefrom with its top beveled edge free and unobstructed for grinding.

These holders are so formed as to straddle the back or rear edge portion of the scraper and interlock therewith against longitudinal movement of the scraper, and permit the scraper to be dropped into and lifted from the holders, and so that the very act of dropping the blade into the holders will cause the blade to automatically assume the required angular position for grinding and maintain that position until the blade is lifted from the holders.

Suitable means are provided to clamp or lock the scraper down in position interlocked with the holders and against accidental upward play or movement in or from the holders.

For instance, I show a common form of work securing clip 5, mounted on the rearwardly extending top platform 3a, of each holder with its downturned rear end bearing against and rockable on the top surface of the platform 3a, and its free front end removably bearing down on the back portion of the adjacent end of the scraper. As is common with locking removable work securing clips of this character, a bolt 6 rises from the platform 3a, of each holder 3, and extends loosely through the center slot of the clip 5, and carries a clamping nut 6a, bearing down on the center portion of the clip and whereby the clip is tightened and released, as will be well understood by those skilled in the art.

With the scraper held and positioned for grinding as hereinbefore described, various means can be provided for performing the grinding operation thereon.

For instance, I show the front side of the table top 1, provided with a top longitudinal dove-tailed slideway 7, on which a dove-tailed slide 8, is movable longitudinally and to which it is confined. This slide 8, at its top provides a horizontal transverse dove-tailed slideway 8a, on which a transverse movable slide 9, is arranged and to which it is confined.

On this slide 9, is mounted an electric motor 10, normally fixed thereto in any suitable manner with its motor shaft horizontal and arranged transversely with respect to the longitudinal axis of the slideway 7, and with respect to the axis of the scraper *a*, to be ground. At its rear end the rotary motor shaft carries any suitable rotary grinding wheel 11, having a flat vertical, preferably annular, rear grinding face 11a, arranged to be brought into operative grinding relation with the top longitudinal edge portion of the scraper blade *a*.

In view of the soft character of the material of the blade *a*, I have found it desirable to use a cone or bell-shaped grinding wheel 11 of a well known form and to rotate this wheel at a high rate of speed say up to 3600 R. P. M. more or less although my invention is not so limited.

I provide any suitable means for propelling the slide 8, and its load (slide 9, and motor 10,) in either direction longitudinally of the slideway 7, although in the specific example illustrated I show a fixed rack 12, extending longitudinally of the table top 1, and a rotary shaft 13, mounted in a bracket 14, rigid with and depending from the slide 8, and having pinion 14, meshing with the rack 12, and having a handle such as 15, for rotating the shaft to propel the slide 8, and its load as will be well understood by those skilled in the art.

Any suitable means can be provided to adjust the vertical rotating grinding face 11a, of the grinding wheel 11, toward and from grinding relation with respect to the scraper blade a, although in the specific example illustrated I show a screw and nut adjustment 16, between the bracket 14, and the slide 9, with a readily accessible front finger wheel 17, for rotating the adjusting screw that controls the adjustment and position of the transverse slide 9, that carries the motor 10. The motor 10, and its vertically rotating grinding wheel 11, are movable in a straight fixed horizontal path in front of and parallel with the longitudinal axis of the scraper blade a, to be ground and this path usually exceeds the length of the blade so that the blade can be ground throughout its entire length without application of substantial rearward pressure of the vertical grinding face of wheel 11 against the edge of the blade being ground.

The blade being ground and its holder consisting of two or more upright brackets 3, are located some distance to the rear of the slideway 7, along which the motor carriage travels during the grinding operation, and the motor and its grinding wheel 11, overhang the space between the slideway 7, and the holders 3. I locate along this space a fixed upright dust guard screen or partition 18 located in front of the vertical plane in which the grinding wheel 11, travels, to reduce to the minimum forward flow of the dust flying from said grinding wheel during the grinding operation and to thereby protect the slideway surfaces and slides and the motor from the flying particles resulting from the grinding operation.

I can further protect the surfaces of the slideway 7 from dust and dirt by covering the same with longitudinal top canvas or other fabric belts 20, attached to and extending in opposite directions from the slide 8, over guides or pulleys 21 beyond the opposite ends of the slideway 7, and having their free depending ends 22, weighted so that these belts extending in opposite directions from the slide 8, and traveling back and forth with the slide will always cover and protect the slideway.

It will be readily understood by those skilled in the art that after a scraper blade has been dropped into interlocking relation to the two holders 3, and has been secured against upward movement by the two clips 5, that the motor 10, will be moved to a position at one end of the beveled edge of the blade a, and then adjusted toward the blade to bring the vertical edge 11a, of the grinding wheel into proper grinding relation with the blade. The motor through the medium of handle 15 will then be caused to travel horizontally toward the other end of the blade a, until its rotating grinding wheel 11 has produced the desired bevel throughout the front side of the cutting end of the blade. The blade will then be lifted from the holders 3, after the clips 5, have been manipulated to release the blade. The blade will then be reversed and again dropped into the holders to present the opposite side of the blade for beveling and grinding as will be well understood by those skilled in the art.

Forwardly projecting stops 25, are arranged at the table ends to engage the edges of the bracket 14, that is rigid with and depends beyond the front edge of the table from the motor carrying slide 8, and thereby define the limits of straight line travel of the motor, and prevent the slide 8, from running off the ends of the dovetailed slideway 7.

Provision for vertical adjustment of the scraper or for the scraper holders 3, or for the motor, is not necessary to compensate for reduction in the vertical width of the scraper by repeated grindings, for the reason that the vertical preferably annular grinding edge or face 11a, of the grinding wheel 11, is of relatively large diameter and its axis of rotation is located sufficiently low with respect to the top edge of the scraper, to provide the necessary grinding contact between the grinding wheel and scraper until the scraper is worn down to the limit of its usefulness.

It will be noted, that the scraper holder provides rigid or fixed means into which the scraper back can be dropped and that centers the scraper longitudinally and against longitudinal movement by providing fixed end walls or abutments located between and engaging the inner end or edge walls of the ears c', rigid with the ends of the scraper back. In other words, the two fixed holder brackets will be located between the depending ears c', of the scraper with outer side end walls, such as the vertical side faces of webs or flanges 3d, that fit the inner vertical edge faces of ears c', and thereby prevent longitudinal movement of the scraper in the holder and center the scraper in and between the brackets.

Where the scraper blades present projections at the back faces of their ends, such as formed by the heads of the bolts *f*, that fit the otherwise flat back of the clips *d*, I prefer to form the otherwise flat transversely inclined floors of the sockets 3*b*, in the tops of the holder brackets 3, with depressions 3*e*, open at their outer ends into the vertical extensions 3*c*, of the sockets, see Fig. 6. These depressions 3*e*, are formed to receive said bolt heads so that the longitudinal back surfaces of the clips *d*, can otherwise seat squarely on the floors of sockets 3*b*.

Where the openings *e*, through the scraper blades are partially obstructed by the bolts *f*, and their nuts, I prefer to form the inner ends of clips 5, with reduced noses or ends 5*b*, to enter the openings 5, between the bolt nuts and the adjacent end walls of the recesses and thus seat on the floors or bottom walls of the recesses when in blade clamping adjustment.

The front plate or bracket 14, that depends from slide 8, beyond the front edge of the table top and to a point below the level thereof, is rigid with said slide and connected therewith through the medium of forwardly projected neck 14*a*. For instance, the slide, neck 14*a*, and plate or bracket 14, can be formed by a single casting.

Obviously, it is within my invention, to form the table top with various sets of bolt holes for the vertical bolts that rigidly clamp the bases 3′, of the holder brackets 3, to the table top, to permit shifting of the said brackets toward and from each other to accommodate scraper blades of different lengths. However, when shifted to vary the distance between them, the brackets will then be rigidly secured in fixed positions.

It is evident that various changes, modifications and departures might be resorted to without departing from the spirit and scope of my invention and hence I do not wish to limit myself to approximately the exact embodiment illustrated.

What I claim is:—

1. Grinding mechanism including an elongated support; a slide movable back and forth longitudinally of said support; a motor carried by said slide and provided with and driving a rotary shaft having at its rear end a grinding wheel overhanging said support rearwardly beyond the slide; and means for holding a scraper blade in fixed inclined position longitudinally of said support behind said slide and the motor with the blade edge in operative grinding relation to said wheel, said means embodying upstanding rigid brackets normally fixed to said support and slotted downwardly through their upper ends to receive the back of a scraper blade, said slots providing opposing fixed upwardly inclined walls to fit opposite sides of the blade and hold the same rigidly at the desired angle for grinding, said brackets having vertical walls to center said blade; and clips on the upper ends of the brackets for holding the blade down in its fixed interlocked relation with the brackets.

2. Scraper blade grinding mechanism including an elongated support; a scraper blade holder secured to said support and embodying rigid brackets spaced longitudinally of said support and having top faces and depending sockets opening upwardly through said faces to vertically receive the scraper blade back, said sockets opening through the opposite side faces of the brackets and providing fixed floors to limit the downward movement of the blade within the sockets, and fixed upstanding opposite faces to rigidly hold the blade at the desired angle for grinding, said brackets providing fixed stop faces to hold the blade against longitudinal movement in the brackets; and a slide movable longitudinally of said support and provided with a grinder and its operating means for grinding said blade held by said holder.

Signed at the city of Baltimore, State of Maryland, this 22 day of September, 1927.

HARRY CLEMSON COVER.